United States Patent [19]

Caudron et al.

[11] Patent Number: 5,517,526
[45] Date of Patent: May 14, 1996

[54] TIMING RECOVERY DEVICE IN A RECEIVER CIRCUIT FOR MODEMS

[75] Inventors: Charles Caudron, Boissy Le Cutte; Abdallah Tourbah, Chilly Mazarin, both of France

[73] Assignee: Alcatel Cit, Paris, France

[21] Appl. No.: 156,913

[22] Filed: Nov. 24, 1993

[30] Foreign Application Priority Data

Nov. 25, 1992 [FR] France ................... 92 14168

[51] Int. Cl.[6] ................ H04B 3/04; H04L 7/02
[52] U.S. Cl. ................ 375/232; 375/355
[58] Field of Search ................ 375/232, 235, 375/316, 340, 355, 371, 373; 364/724.16, 724.19, 724.2

[56] References Cited

U.S. PATENT DOCUMENTS

| | | | |
|---|---|---|---|
| 4,334,313 | 6/1982 | Gitlin et al. | 375/355 |
| 4,416,015 | 11/1983 | Gitlin | 375/232 |
| 4,531,220 | 7/1985 | Brie et al. | 375/232 |
| 4,815,103 | 3/1989 | Cupo et al. | 375/234 |
| 5,278,867 | 1/1994 | Sehier et al. | 375/232 |
| 5,283,813 | 2/1994 | Shalvi et al. | 375/230 |

OTHER PUBLICATIONS

AT & T Technical Journal, vol. 66, No. 6, Nov. 1987, New York, US, pp. 63–78, Gitlin and Meadors: "Center—tap tracking algorithms for timing recovery".

*Primary Examiner*—Young T. Tse
*Attorney, Agent, or Firm*—Sughrue, Mion, Zinn, Macpeak & Seas

[57] ABSTRACT

A receiver circuit for audio frequency modems, comprising an input module (11) for receiving and sampling an analog input signal representing digital data, an adaptive equalizer (12, 14, 15) having a transversal filter (12) with a plurality of complex multiplier coefficients ordered relative to a usually central highest norm coefficient to generate symbols at a given symbol rate from the sampled analog signal, and a timing recovery device comprising devices (12, 16, 18, 19) responsive to displacement of at least one of the coefficients, relative to said central position, to control an oscillator (20) supplying a timing signal.

6 Claims, 3 Drawing Sheets

TIMING RECOVERY DEVICE IN A RECEIVER CIRCUIT FOR MODEMS

BACKGROUND OF THE INVENTION

The invention concerns a receiver circuit, in particular a receiver circuit for audio frequency modems, comprising means for receiving and sampling an analog input signal representing digital data, an adaptive equalizer having a transversal filter with a plurality of complex multiplier coefficients ordered relative to a usually central highest norm coefficient to generate symbols at a timing rate from a sampled analog signal and a timing recovery device.

The document IEEE TRANSACTIONS ON COMMUNICATIONS, Vol.comm-26, No 5, "Passband Timing Recovery in All-Digital Modem Receiver—D. Godard", dated 5 May 1978, discloses a timing recovery device for a quadrature amplitude modulation modem in which a timing signal is recovered from two characteristic frequencies in the spectrum of the received signal on opposite sides of the frequency band used to transmit the digital data. For a modulated 1800 Hz carrier type received signal the two characteristic frequencies are 600 Hz and 3000 Hz. The basic principle of timing recovery is as follows. If at a given time there exists within the spectrum of the received signal a signal at a frequency near 600 Hz (604 Hz, for example) there is also a signal at a frequency near 3000 Hz (3004 Hz, for example). This property enables calculation of representative values of timing drift used to control an oscillator. Two filters respectively centered on the frequencies of 600 Hz and 3000 Hz are used for this. The filter centered on 600 Hz outputs sin(604 Hz) and cos(604 Hz) signals. The filter centered on 3000 Hz outputs sin(3004 Hz) and cos(3004 Hz) signals. The following trigonometrical equation applies:

sin (2400 Hz)=sin (3004 Hz). cos (604 Hz)−cos (3004 Hz). sin (604 Hz)

The value of the signal sin(2400 Hz) sampled at 2400 Hz is used to control the oscillator supplying the timing signal.

A timing recovery device of this kind has drawbacks and in particular it cannot be used for transmission lines which attenuate the analog signal near the characteristic frequency of 3000 Hz. Also, it is standard practice to use the sidebands available in the frequency spectrum of the analog signal to transmit service data. The existence of the two characteristic frequencies used for timing recovery makes the use of the sidebands more difficult.

SUMMARY OF THE INVENTION

An object of the invention is to remedy these drawbacks.

To this end the invention consists in a receiver circuit characterized in that the timing recovery device comprises first means responsive to displacement of at least one of said coefficients relative to said central position to control second means supplying a timing signal.

The physical principle underlying the invention is as follows. If timing drift occurs, i.e. if the time at which the analog signal is sampled is offset from its ideal position, the algorithm for calculating the coefficients of the transversal filter of the adaptive equalizer shifts the coefficients of the transversal filter in the shift register of the transversal filter.

Detection of shifting of the coefficients may be limited to detection of shifting of the highest norm coefficient (main coefficient) relative to the central position that it normally occupies.

In a particularly simple, low-cost embodiment particularly suited for digital data transmission symbol rates in the order of 2400 bauds, the timing recovery device comprises the transversal filter of the adaptive equalizer and an auxiliary transversal filter receiving samples to be equalized in parallel with the former and whose respective outputs are used to calculate values representative of timing drift used to control an oscillator, the coefficients of the auxiliary transversal filter remaining fixed.

Drift of the transmitted signal carrier frequency is a well-known phenomenon. It is corrected in part by a dedicated drift corrector circuit, and the adaptive equalizer of the receiver circuit is also required to compensate this drift. The compensation applied by the adaptive equalizer corresponds to slow rotation of the vectors representing the coefficients of the transversal filter of the adaptive equalizer and therefore of the vector representing the samples at the output of the transversal filter. If the error values used to control the oscillator are produced from the outputs of the transversal filter of the adaptive equalizer and the auxiliary transversal filter, it is necessary to apply to the vectors, representing the samples at the output of the auxiliary transversal filter, exactly the same rotation as is applied to the vectors representing samples at the output of the transversal filter of the adaptive equalizer.

To this end the timing recovery device further comprises third means responsive to variation in the argument of the highest norm coefficient of the transversal filter of the adaptive equalizer in order to apply an argument correction to each sample at the output of the auxiliary transversal filter.

One embodiment of the invention is described in detail below with reference to the figures.

DESCRIPTION OF THE PREFERRED EMBODIMENT

The same items shown in more than one figure are identified by the same reference numbers.

Figure 1:
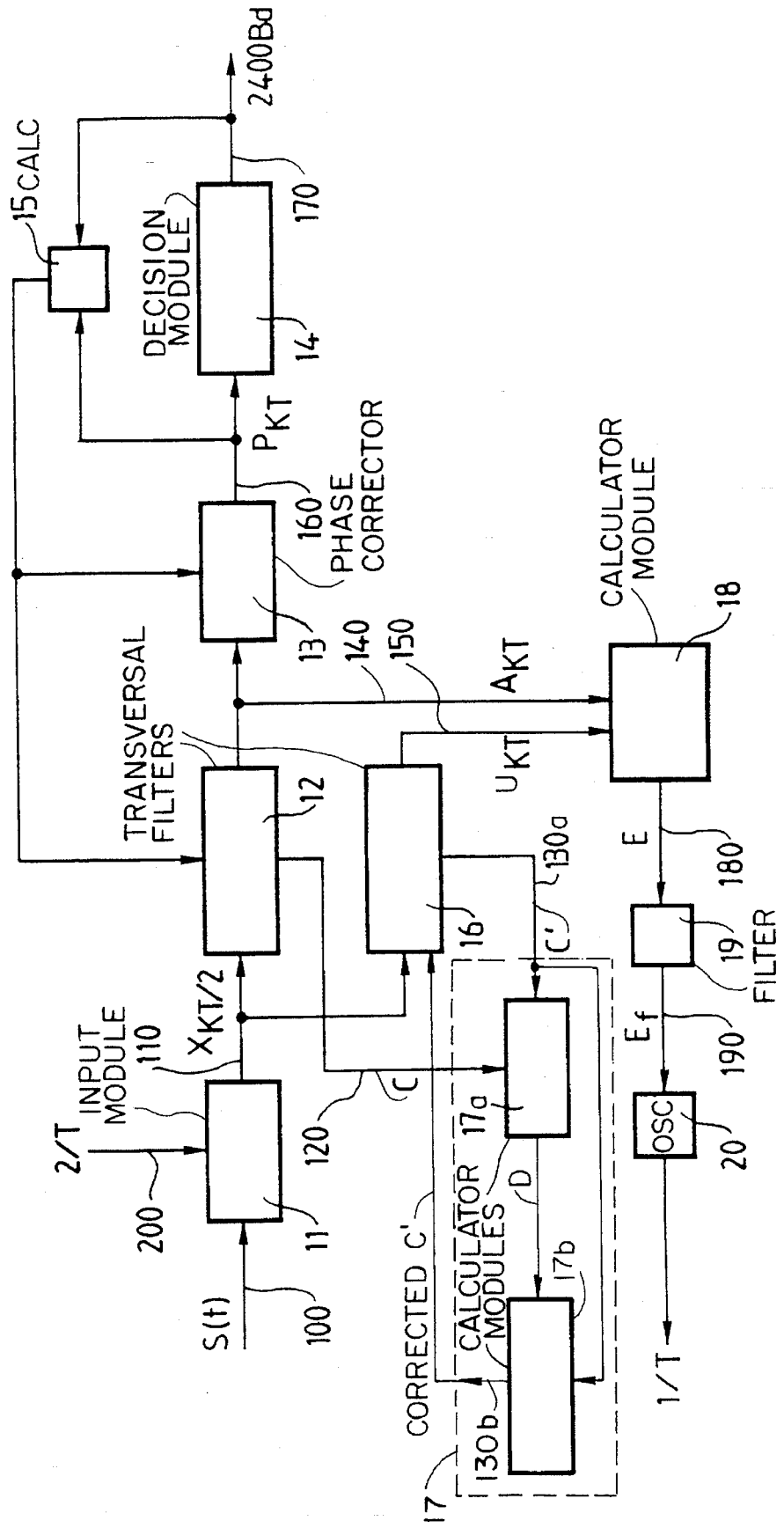
FIG. 1 is a functional block diagram of a receiver circuit in accordance with the invention.

Referring first to FIG. 1, the receiver circuit, which is for example a receiver circuit for a modem connected to a telephone line, comprises an input module 11 which receives the analog input signal s(t) encoded to represent digital data. This input module includes a filter, a sampler and a demodulator controlled by a signal on an input 200 at twice the symbol, i.e., at rate 2/T.

The input module supplies complex samples $X_{kT}/2$ to be equalized to the input 110 of two transversal filters 12 and 16 each having a plurality of complex multiplier coefficients. The transversal filter 12 supplies equalized complex samples $A_{kT}$ on an output 140 and the transversal filter 16 supplies complex samples $U_{kT}$ on an output 150.

The equalized samples $A_{kT}$ from the transversal filter 12 are fed to the input of a conventional phase corrector module 13 to correct any drift in the carrier frequency of the signal s(t). The module 13 produces samples $P_{kT}$ at its output 160 which are fed to a conventional decision module 14. The decision module 14 supplies decided symbols at its output 170 at the symbol rate 1/T of 2400 bauds, for example. The input and the output of the decision module 14 are connected to a calculator module 15. The calculator module 15 is adapted to calculate the complex coefficients of the transversal filter 12 using the least mean square error criterion, for example. It is further adapted to calculate a correction coefficient which is fed to the module 13 to correct the argument of the complex samples $A_{kT}$.

The transversal filter 12, the decision module 14 and the calculator module 15 form an oversampling adaptive equalizer. An equalizer of this kind is based on a microprocessor.

Figure 2:
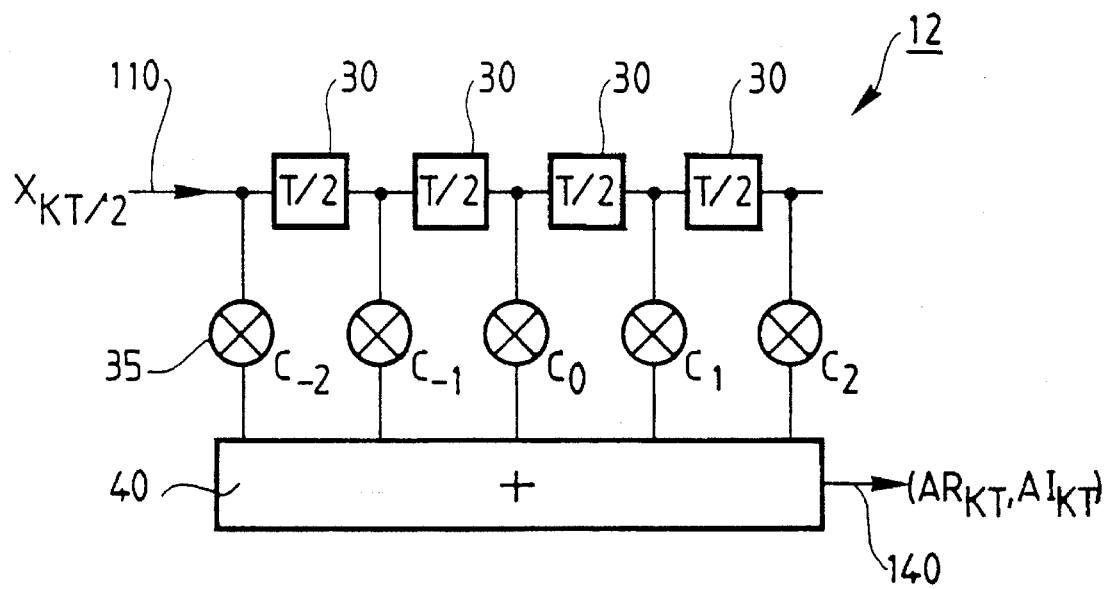
FIG. 2 is a block diagram showing in more detail the transversal filter of the adaptive equalizer of the receiver circuit from FIG. 1.
Figure 3:
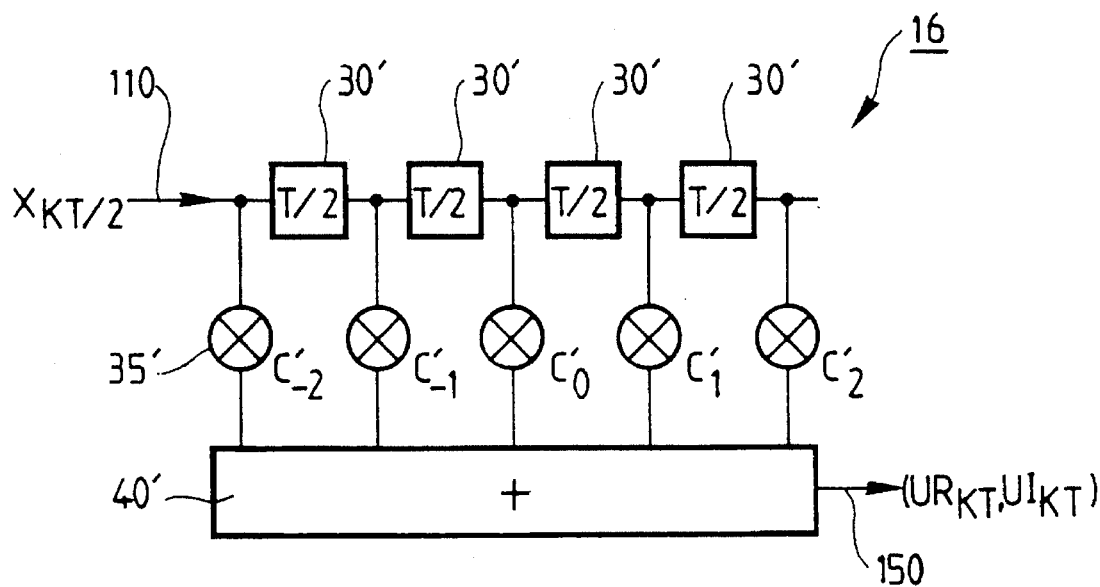
FIG. 3 is a block diagram showing in more detail the auxiliary transversal filter of the timing recovery device in accordance with the invention.

Referring now to FIGS. 2 and 3, the transversal filter 12 has a plurality of taps 30 associated with conventional multipliers 35. FIG. 2 shows five multipliers. The multipliers are adapted to multiply the complex samples $X_{kT/2}$ at the input 110 at successive times (k–2)T/2, (k–1)T/2, (k)T/2, (k+1)T/2, (k+2)T/2, where T/2 denotes half the baud period, by the respective coefficients $C_{-2}$, $C_{-1}$, $C_0$, $C_1$, $C_2$. The results of these multiplications are summed in an adder 40 which produces at its output equalized complex samples $A_{kT}$ which have a real part $AR_{kT}$ and an imaginary part $AI_{kT}$. The filter 12 could have a greater number of taps 30, multipliers 35 and thus of multiplier coefficients C.

Referring to FIG. 3, the auxiliary transverse filter 16 also has a plurality of taps 30' associated with conventional multipliers 35'. The five multipliers shown are adapted to multiply the complex samples $X_{kT/2}$ at the input 110 by the complex multiplier coefficients $C'_{-2}$, $C'_{-1}$, $C'_0$, $C'_1$, $C'_2$. The results of these complex multiplications are summed in an adder 40' which produces at its output complex samples $U_{kT}$ having a real part $UR_{kT}$ and an imaginary part $UI_{kT}$. The coefficients C' of the filter 16 are not adjusted, i.e. their norm remains constant.

In FIGS. 2 and 3, the highest norm coefficient (main coefficient) is identified by the subscript 0. $C_0$ is therefore the main coefficient of the filter 12 and $C'_0$ is the main coefficient of the filter 16.

If there is any drift in the timing rate the coefficient $C_0$ moves to the left or to the right relative to its central position as shown in FIG. 2. The same applies to the other coefficients $C_{-2}$, $C_{-1}$, $C_1$, $C_2$. Because the coefficients C' of the filter 16 are not adjusted, the coefficient $C'_0$ remains fixed relative to its central position as shown in FIG. 3. The same applies to the other coefficients of the filter 16.

Referring again to FIG. 1, the samples $U_{kT}$ and the samples $A_{kT}$ on the respective outputs 150 and 140 are fed to a calculator module 18. The calculator module 18 supplies at its output 180 digital values E representing any drift of the timing. The successive values E are fed into a filter 19 which produces at its output 190 a timing error signal Ef. The timing error signal Ef controls an oscillator 20 supplying the timing signal 1/T.

The installation and operation of the timing recovery device in accordance with the invention are as follows.

The oscillator 20 is initially isolated from the timing recovery device to produce a local timing signal whose frequency is not adjusted. The complex samples $X_{kT/2}$ supplied by the module 11 are equalized by the adaptive equalizer and the coefficients C of the transversal filter 12 are adjusted by the calculator module 15 to minimize the mean squared error at the output of the adaptive equalizer. When convergence of the adaptive equalizer has been achieved (convergence may be detected by comparing the square error with a predetermined threshold), the main coefficient $C_0$ of the filter 12 normally occupies a central position as shown in FIG. 2. The coefficients C of the filter 12 are then copied automatically by a suitable program in the filter 16 and become the coefficients C'. The main coefficient $C'_0$ consequently occupies a central position as shown in FIG. 3. The filter 16 may have a smaller number of multiplier coefficients than the filter 12 so that only some of the coefficients C of the filter 12 are coefficients C' of the filter 16. These are preferably the highest norm coefficient $C_0$ (main coefficient) and the coefficients near the main coefficient.

After these operations the timing recovery device is in service. The outputs of the filters 12 and 16 are synchronized so that a value E representing a timing drift is calculated by the module 18 using the following equation:

$$E = AR_{-1}.UR + AI_{-1}.UI - AR.UR_{-1} - AI.UI_{-1}$$

in which:

AR denotes the real part of a complex sample A at the output of the transversal filter 12 at the time $T_0$ defined as the present time;

AI denotes the imaginary part of the sample A;

UR denotes the real part of a complex sample U at the output of the auxiliary transversal filter 16 at time $T_0$;

UI denotes the imaginary part of the sample U;

$AR_{-1}$ denotes the real part of a complex sample $A_{-1}$ at the output of the transversal filter 12 at the time $T_{-1}$ defined as the time preceding the time $T_0$ by one baud period;

$AI_{-1}$ denotes the imaginary part of the sample $A_{-1}$;

$UR_{-1}$ denotes the real part of a complex sample $U_{-1}$ at the output of the auxiliary transversal filter 16 at time $T_{-1}$;

$UI_{-1}$ denotes the imaginary part of the sample $U_{-1}$.

A non-null value E represents a shift of the coefficient $C_0$ of the filter 12 relative to the central position that it occupies in the absence of any timing drift. This position is equivalent to that of the coefficient $C'_0$ of the filter 16. Thus if the successive values E tend to be negative, this means that the transmit timing is higher than the receive timing. The frequency of the timing signal supplied by the oscillator 20 is increased. Conversely, if the successive values E tend to be positive, the frequency of the timing signal supplied by the oscillator 20 is reduced. A filter 19 receiving the successive values E at its input converts these values into the control signal Ef.

In accordance with another aspect of the invention a calculator module 17 is further provided for detecting slow rotation of the vectors representing the coefficients C of the filter 12 because of drift affecting the carrier frequency of the signal s(t) and for correcting the samples at the output of the filter 16 accordingly.

Detection is simply achieved by calculating an angle value D representing the difference between the argument of the main coefficient $C_0$ of the filter 12 and the argument of the main coefficient $C'_0$ of the filter 16. This angle value D is substantially equal to the sine of the angle between the trigonometrical forms of two main complex coefficients $C_0$ and $C'_0$ if it is assumed that this angle value is small. The value of D must of course be calculated periodically at time intervals that are short relative to the frequency drift phenomenon.

The value D may be expressed by the following equation:

$$D = r'.x - r.x'$$

in which:

r+j.x is the trigonometrical representation of $C_0$, r'+j.x' is the trigonometrical representation of $C'_0$.

−r is the real part of $C_0$, x is the imaginary part of $C_0$ r' is the real part of $C'_0$, and x' is the imaginary part of $C'_0$.

Figure 4:
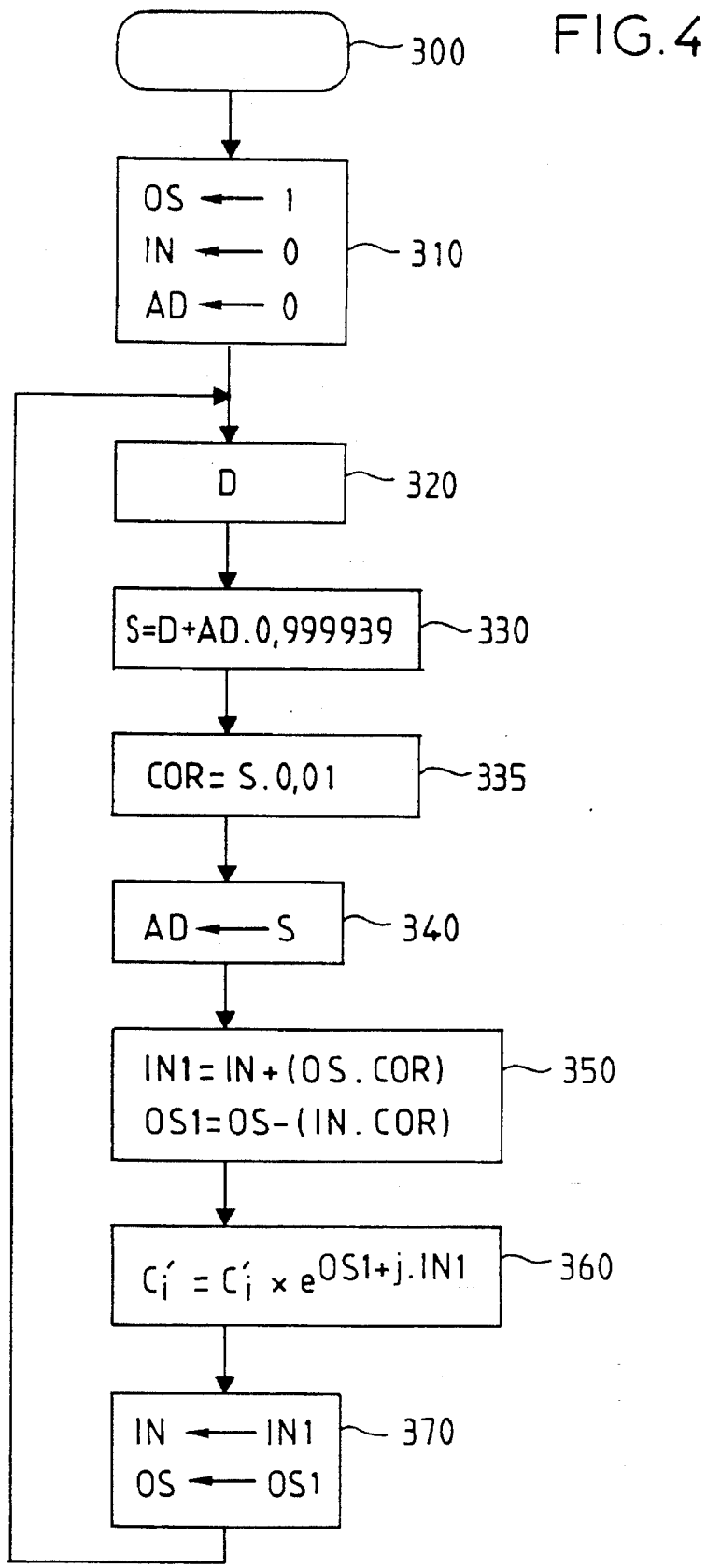
FIG. 4 is a flowchart showing the operation of a calculation module which is part of the timing recovery device in accordance with the invention.

After each calculation of the value D, the calculator module 17 multiplies each coefficient C' of the filter 16 by a correction complex number having a unity modulus and an argument that varies with D. The arguments of the complex samples $U_{kT}$ are corrected accordingly. If $C'_i$ is a coefficient of the filter 16 to be corrected, the new value of the coefficient $C'_i$ is obtained by applying the calculation procedure implemented in the calculator module 17 and shown in FIG. 4.

This procedure starts with step 300. In this step the coefficients C of the filter 12 are copied into the filter 16. Variables OS, IN, AD are respectively initialized to 1, 0 and 0 in the next step 310. An angle value D is calculated in step 320 using the equation given above. First order filtering is applied to the angle value D in step 330 in which a variable S is calculated using the following equation:

$$S = D + AD \times 0.999939$$

In step 335 a variable COR is calculated using the following equation:

$$COR = S \times 0.01$$

In step 340 the variable AD is updated and is then equal to the value S.

In step 350 variables OS1 and IN1 are calculated using the following equations:

$$OS1 = OS - (COR.IN)$$

$$IN1 = IN + (COR.OS)$$

In step 360, the module 17 replaces the value of each complex coefficient $C'_i$ of the filter 16 with a new value given by the following equation:

$$C'_i = C'_{i.e} OS1 + j.IN1$$

in which e denotes the exponential function.

In step 370, the variables IN and OS are replaced by respective variables IN1 and OS1. The procedure then continues by returning to step 320 to calculate a new angle value D.

If the successive values E for controlling the oscillator 20 are calculated directly from the values of the coefficients $C_i$ and $C'_i$ of the filters 12 and 16, there is no utility in providing a frequency drift compensator module 17.

For low symbol rate transmission, the adaptive equalizer of the receiver circuit may be of the sampling rather than the oversampling type.

What is claimed is:

1. A receiver circuit, in particular a receiver circuit for audio frequency modems, comprising: means for receiving and sampling an analog input signal representing digital data and for supplying a sampled analog signal in the form of complex samples, an adaptive equalizer having a transversal filter with a plurality of complex multiplier coefficients ordered relative to a usually central-position highest norm coefficient to generate symbols at a given symbol rate from the sampled analog signal, and a timing recovery device comprising first means responsive to displacement of at least one of said coefficients, said displacement being relative to said central position, to control an oscillator supplying a timing signal; characterized in that the timing recovery device comprises:

the transversal filter of the adaptive equalizer, and an auxiliary transversal filter having a plurality of complex multiplier coefficients, at least some of these latter being equal to the coefficients of the adaptive equalizer at a given time during reception of the analog signal, said transversal and auxiliary transversal filters receiving complex samples to be equalized, in parallel, said coefficients of the auxiliary equalizer each having a norm which is kept constant; and a first calculator module connected to the outputs of the transversal filter of the adaptive equalizer and of the auxiliary transversal filter to supply a first value E which is representative of timing drift, and which controls said oscillator.

2. The receiver circuit according to claim 1, wherein the frequency of the timing signal supplied by said oscillator increases when said first value E is below zero and decreases when said first value E is above zero.

3. The receiver circuit according to claim 1, wherein said first value E representing timing drift is calculated from the following equation:

$$E = AR_{-1}.UR + AI_{-1}.UI - AR.UR_{-1} - AI.UI_{-1}$$

in which:

AR denotes the real part of a complex sample A at the output of the transversal filter of the adaptive equalizer at the time $T_0$ defined as the present time;

AI denotes the imaginary part of the sample A;

UR denotes the real part of a complex sample U at the output of the auxiliary transversal filter at time $T_0$;

UI denotes the imaginary part of the sample U;

$AR_{-1}$ denotes the real part of a complex sample $A_{-1}$ at the output of the transversal filter at the time $T_{-1}$ defined as the time preceding the time $T_0$ by one baud period;

$AI_{-1}$ denotes the imaginary part of the sample $A_{-1}$;

$UR_{-1}$ denotes the real part of a complex sample $U_{-1}$ at the output of the auxiliary transversal filter at time $T_{-1}$; and $UI_{-1}$ denotes the imaginary part of the sample $U_{-1}$.

4. The receiver circuit according to claim 3, wherein the received analog signal is a modulated carrier frequency, the timing recovery device further comprising third means responsive to variation in an argument of a coefficient, i.e., the highest normal coefficient, of the transversal filter of the adaptive equalizer to apply an argument correction to each sample at the output of said auxiliary transversal filter.

5. The receiver circuit according to claim 4, wherein said third means comprises a second calculator module adapted to:

calculate the difference between the respective argument of the highest norm coefficient of the transversal filter of the adaptive equalizer and the highest norm coefficient of the auxiliary transversal filter to produce at least one angle value representing a frequency drift of said modulated carrier frequency; and multiply each coefficient of the auxiliary transversal filter by a complex value whose argument is said at least one angle value.

6. The receiver circuit according to claim 1, wherein the adaptive equalizer is an oversampling type equalizer.

* * * * *